(12) United States Patent
Alter et al.

(10) Patent No.: US 7,424,693 B2
(45) Date of Patent: Sep. 9, 2008

(54) METHODS FOR MEASUREMENT AND PREDICTION OF HOLD-TIME AND EXCEEDING HOLD TIME LIMITS DUE TO CELLS WITH TIED INPUT PINS

(75) Inventors: Stephanie L. Alter, Allentown, PA (US); Kevin D. Drucker, Annandale, NJ (US); Vishwas Rao, Breinigsville, PA (US); Leon Song, Palo Alto, CA (US)

(73) Assignee: Agere Systems Inc., Allentown, PA (US)

( * ) Notice: Subject to any disclaimer, the term of this patent is extended or adjusted under 35 U.S.C. 154(b) by 172 days.

(21) Appl. No.: 11/377,778

(22) Filed: Mar. 16, 2006

(65) Prior Publication Data

US 2007/0094626 A1    Apr. 26, 2007

Related U.S. Application Data

(60) Provisional application No. 60/728,451, filed on Oct. 20, 2005.

(51) Int. Cl.
*G06F 17/50*    (2006.01)

(52) U.S. Cl. .............................................. 716/6; 716/5

(58) Field of Classification Search ................. 716/4–6, 716/1, 2
See application file for complete search history.

(56) References Cited

U.S. PATENT DOCUMENTS

| | | | | |
|---|---|---|---|---|
| 5,883,808 A | * | 3/1999 | Kawarabayashi | 716/2 |
| 7,191,417 B1 | * | 3/2007 | Luo et al. | 716/6 |
| 7,243,323 B2 | * | 7/2007 | Williams et al. | 716/6 |
| 7,278,126 B2 | * | 10/2007 | Sun et al. | 716/6 |

* cited by examiner

*Primary Examiner*—Jack Chiang
*Assistant Examiner*—Binh C Tat
(74) *Attorney, Agent, or Firm*—Priest & Goldstein, PLLC

(57) ABSTRACT

Techniques for estimating a risk of incorrect timing analysis results for signal paths having cells with inputs tied together are described. Signal paths having cells with tied input pins are identified in a circuit. A timing analysis on the signal paths is run to identify the worst case delay through the signal paths. The risk to the signal paths of incorrect timing analysis results due to the cells with tied input pins is estimated by a tied input pin analysis tool. Metrics that quantify timing failure risk associated with signal paths is provided in the form of a set of equations. These equations are embedded into a process allowing automated multi-modal, multi power voltage temperature analysis for the identification of high risk paths.

11 Claims, 4 Drawing Sheets

US 7,424,693 B2

METHODS FOR MEASUREMENT AND PREDICTION OF HOLD-TIME AND EXCEEDING HOLD TIME LIMITS DUE TO CELLS WITH TIED INPUT PINS

CROSS-REFERENCE TO RELATED APPLICATION

The present invention claims the benefit of U.S. Provisional Application Ser. No. 60/728,451 entitled "An Automated Placement Sensitive Methodology For Large-Scale Logic Modifications To Integrated Circuits Containing Logic BIST" filed on Oct. 20, 2005 which is incorporated by reference herein in its entirety.

FIELD OF INVENTION

The present invention relates generally to improved timing analysis methods, and more particularly, to advantageous techniques for measurement and prediction of hold time and the exceeding of hold time limits due to logic cells with tied input pins.

BACKGROUND OF INVENTION

The process of developing a chip typically begins with specifying the chip's function in a high level design language (HDL). After verification, the HDL specified design is synthesized into a hardware design that can be manufactured in a selected technology process based on a library of logic cells for the chosen technology. To verify the timing and functionality of the synthesized design, software models of the logic cells and interconnections between the logic cells are used. In the synthesis process, if a non optimal use of a library logic cell is needed to implement a specified function, then a number of inputs to the logic cell may be tied together to create the desired function. For example, if a three input AND function is required and the closest library cell is a four input AND cell, then two inputs to the four input AND cell may be tied together to create the three input AND function.

Logic cells with input pins tied together present a unique challenge for delay calculation and timing analysis. Due to limitations in software model characterization of logic cells, cell delay calculation models do not fully capture the impact of simultaneously switching inputs on the delays and transition times of output signals. This is because delay calculation model tables are characterized on an input pin to output pin basis, keeping adjacent pins at a non-blocking constant value during the characterization simulations. This approach leads to calculated delays and transitions through such cells with tied input pins which are much slower than actual silicon behavior. Analog simulations have shown that the actual delays can be as much as 43% faster in a 130 nm process, for example, as compared to the delays calculated by the current delay calculation models. In addition, incorrect delays are calculated for fan out signal paths associated with at least one cell connection made through tied input pins. The calculations for the signal paths through all of the connected cells are affected by the one tied input pin connection due to slower slopes used in the delay calculations. The incorrectly calculated delays may cause hold time analysis for signal paths containing the tied input logic cells to be incorrect and these signal paths may then present a high risk of hold time failure. The magnitude of the timing problem is amplified when numerous tied input logic cells are present in synthesized designs. Moreover, multiple such tied input logic cells may be found in single timing paths. Such problems occur due to a combination of inherent limitations in the synthesis process, limited choices of logic cell types in technology libraries, and restrictive design styles, for example.

SUMMARY OF INVENTION

Among its several aspects, the present invention recognizes that there is a need for more accurately analyzing the effect of tied input logic cells on delay calculations and in assessing a risk of timing and function failure due to such logic cells before fabricating a circuit.

To such ends, an embodiment of the present invention provides a method for risk estimation. A signal path having at least one cell with tied input pins is identified in a circuit. A timing analysis on the signal paths is run to determine a hold slack at the end of the signal path, wherein the hold slack is the difference of a worst case delay through the signal path and a cycle time of the circuit. The risk to the signal path of incorrect timing analysis results is estimated to be a ratio of the delay through the at least one cell to the hold slack.

Another embodiment of the present invention addresses a computer-readable medium containing a program for risk estimation. A signal path having at least one cell with tied input pins is identified in a circuit. A timing analysis on the signal paths is run to determine a hold slack at the end of the signal path, wherein the hold slack is the difference of a worst case delay through the signal path and a cycle time of the circuit. The risk to the signal path of incorrect timing analysis results is estimated to be a ratio of the delay through the at least one cell to the hold slack.

Another embodiment of the present invention addresses an apparatus for estimating a risk of incorrect timing analysis results. The apparatus has a chip database having a circuit synthesized to a technology library with signal paths having tied input pins. The apparatus also has a tools database having timing analysis tools, constraint files and parasitic data for signal paths, delay calculation tables based on cell characterization data, and a tied input analysis tool. A processor, such as a server for example, is used for running the tied input analysis tool for estimating the risk of incorrect timing analysis of signal paths having cells with tied input pins.

A more complete understanding of the present invention, as well as other features and advantages of the invention, will be apparent from the following detailed description and the accompanying drawings.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

A timing analysis tool evaluates delays in a signal path beginning at a starting point, such as a latch output, to an end point, such as a latch input. The delays are calculated based on a model of the elements the signal path encounters on its path from the start point to the end point. A signal path delay is required to be less than or equal to the cycle time for the circuit. A positive slack, for example, indicates the signal arrived in less than the cycle time and a negative slack indicates the path exceeded the cycle time. A negative slack indicates that either the circuit must be slowed down thereby increasing the cycle time or the signal path must be sped up, or some combination of the two. Timing analysis and delay models play a critical role in the design of high speed circuits.

Delay models include models for routing path capacitance and for the delays through technology library cells that are used. A technology library may include relatively simple functions, such as 4-input AND gates, 2-input OR gates, and the like, and more complex functions, such as, latches, multiple input multiplexers, and the like. These delay models are based upon transistor circuits used to construct the cells. Such delay models, of necessity, due to the millions of cells used in complex chips that must be evaluated, make assumptions on the cell circuit's operating characteristics. In the case of tied-input pins, the delay models may be inaccurate as discussed above. Assessing the timing inaccuracies associated with tied input pins may be accomplished by use of embodiments of the present invention.

Figure 1:
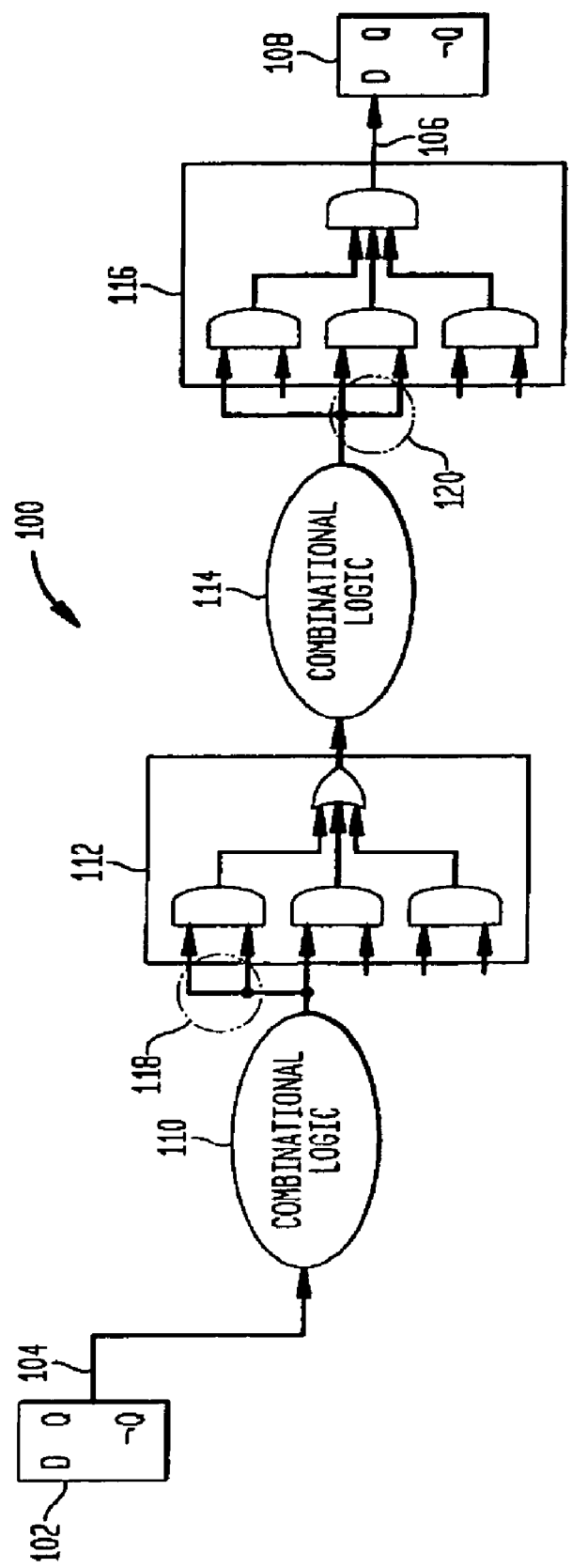
FIG. 1 illustrates an exemplary signal path with logic cells having tied input pins.

FIG. 1 illustrates an exemplary signal path 100. This signal path 100 begins at output 104 of latch 102 and ends at input 106 of latch 108. The signal path also includes combinational logic 110, logic cell 112, combinational logic 114, and logic cell 116. It is noted that logic cells 112 and 116 have tied input pins 118 and 120, respectively. Signal path 100 is evaluated with a timing analysis tool which provides an evaluation of the path including slack and other assessments. For example, a hold slack value may be produced that is the maximum available hold slack at input 106 to latch 108. Due to the tied input pins 118 and 120, the timing analysis tool may produce results that are incorrect for path 100. These results may even indicate a nonexistent timing failure.

In addition to the timing analysis tool, a characterization of a cell with tied input pins may be carried out by use of analog simulations. HSPICE®, a registered trademark of Synopsis, Inc., is an example of a tool that provides highly accurate analog simulations of signal paths and cells. Results of HSPICE® simulations of a cell may be compared to the delay values provided by the timing analysis tool for the same cell. Such a comparison is used to generate a worst case delay reduction percentage. Since a technology library contains a large number of cells, the worst case delay reduction percentage for the library as a whole may be estimated by generating an average worst case delay reduction percentage for a select sample of cells. Alternatively, for a conservative analysis, the worst case delay reduction percentage for a select sample of cells which would provide the highest risk in the tied input pin analysis may be used as a representative value for the technology library.

Due to the extensive analysis required, the values for worst case delay reduction percentage may not be generally available for cells or for the technology library. If these worst case delay reduction percentages are not available, then the risk associated with a timing path containing N cells with tied input pins can be quantified by examining a ratio between the total delay due to tied input pins on a path versus the available slack on the path. This ratio is referred to by its name as "tied-delay/slack %" and is given by equation 1:

$$\text{tied} - \text{delay/slack} \% = \frac{\sum_{i=1}^{N} \text{delay}(tcell_i)}{holdslack(\text{register})} \quad \text{Equation 1}$$

where the parameter $tcell_i$ represents each logic cell "i" with tied input pins on a signal path and where there are up to N cells with tied input pins. In FIG. 1, for example, $tcell_i$ is logic cell 112 and $tcell_n$ is logic cell 116. The holdslack(register) parameter is the maximum available hold slack at a register or latch input. For example, the hold slack for latch 108 is measured at the input 106 to latch 108. If signal path 100 is just meeting timing based on the results of a timing analysis tool, then the hold slack at the input 106 to latch 108 would be very small indicating the signal path is a critical path for the design. As the number of cells with tied input pins increases in the signal path, then the tied-delay/slack % would also increase, indicating there is more risk for the results of the timing analysis tool to be incorrect. Signal paths with larger hold slack would typically have less risk. Based on this consideration, critical paths are analyzed and evaluated first.

If the worst case delay reduction percentage is available as a representative technology value, "worst case delay reduction % (tech)", then the risk due to tied input pins in a timing path may be more accurately quantified by equation 2. This risk is referred to by its name as "tied tech delay reduction/slack %".

$$\text{tied tech delay reduction/slack} \% = \quad \text{Equation 2}$$

$$\frac{\text{worst case delay reduction \%(tech)}}{100} * \frac{\sum_{i=1}^{N} \text{delay}(tcell_i)}{holdslack(\text{register})}$$

where the parameter $tcell_i$ represents each logic cell "i" with tied input pins on a signal path with up to N cells with tied input pins and the holdslack(register) parameter is the maximum available hold slack at a register or latch input.

If the worst case delay reduction percentage for each logic cell type is known in advance as the "delay reduction % (celltype($tcell_i$))", then a metric taking such reduction percentage into account may be more accurately quantified by equation 3. This risk is referred to by its name as "tied cell delay reduction/slack %".

$$\text{tied cell delay reduction/slack} \% = \quad \text{Equation 3}$$

$$\frac{\sum_{i=1}^{N} (\text{delay}(tcell_i) * \frac{\text{delay reduction \%}(celltype(tcell_i))}{100})}{holdslack(\text{register})}$$

where the parameter $tcell_i$ represents each logic cell "i" with tied input pins on a signal path with up to N cells with tied input pins and the holdslack(register) parameter is the maximum available hold slack at a register or latch input. The function celltype($tcell_i$) returns the celltype for $tcell_i$.

Equations 1, 2, and 3 provide an estimate of the risk involved if the delay through the cells with tied input pins is different than predicted by conventional delay calculation. The risk of hold-time failure on a timing path containing these tied-input cells is proportional to the relationship between the hold-slack at the endpoint, the number of tied-cells in the path, and the magnitude of the delay and slope changes through such cells. The greater the available hold-slack for the path, the lower the risk. The greater the number of tied-input cells on a path and/or the greater the magnitude of the delay/slope changes, the higher the risk. Equations 1, 2, and 3 estimate the risk with varying degrees of accuracy depending on the availability of the delay reduction percentage data for the technology library and for each cell.

Figure 2:
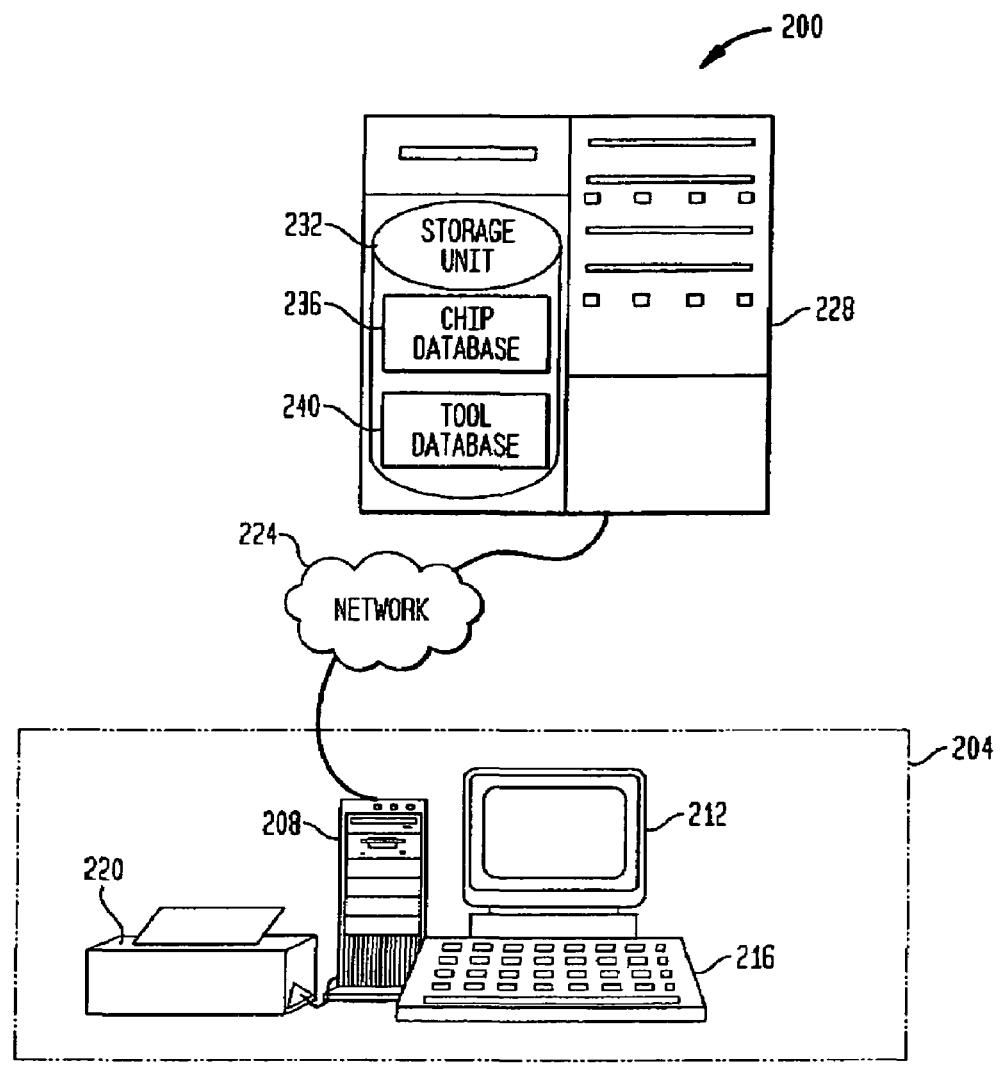
FIG. 2 illustrates a timing analysis system in accordance with an embodiment of the present invention.

FIG. 2 illustrates a timing analysis system 200 in accordance with an embodiment of the present invention. The timing analysis system 200 may suitably include a timing analysis station 204 consisting, for example, of a processor complex 208, a monitor 212, a keyboard/mouse 216, and may include a printer 220. The timing analysis station 204 is connected to a network 224. This connection may be made utilizing the Internet or a local intra-net, for example. The network 224 is then further connected to a processor, such as a server 228 or a server farm, for example. The server 228 contains or is connected to a storage unit 232 having access to a chip database 236 and a tools database 240. The chip database 236 contains information concerning the design, such as, a circuit synthesized to a technology library with signal paths containing tied input pins, a netlist for all wires in the design, the technology library cells used in the design, and the like. The tools database 240 contains timing analysis tools, constraint files and parasitic data for signal paths in the design, delay calculation tables, and a tied input analysis tool. For example, the parasitic data is made up of distributed resistance and capacitance networks for all the wires in the design and the delay calculation tables are multi-dimensional tables that are built using cell characterization data. These tables contain the relationships between various delay calculation parameters, such as, input-transition-slope, output load, and the like, of a cell that are used to compute the output transition-slope and delay through a cell.

A tied input pin analysis tool as an embodiment of the present invention and as described in more detail below is also operative in the server 228 and controlled by the timing analysis station 204. The tied input pin analysis tool may be stored as electronic media in the storage unit 232 on a high density disk drive, an optical disk drive, or the like. The tied input pin analysis tool, as a computer-readable medium, may also be downloaded over a communication network from a remote network device, such as a server or mass storage unit.

Figure 3:
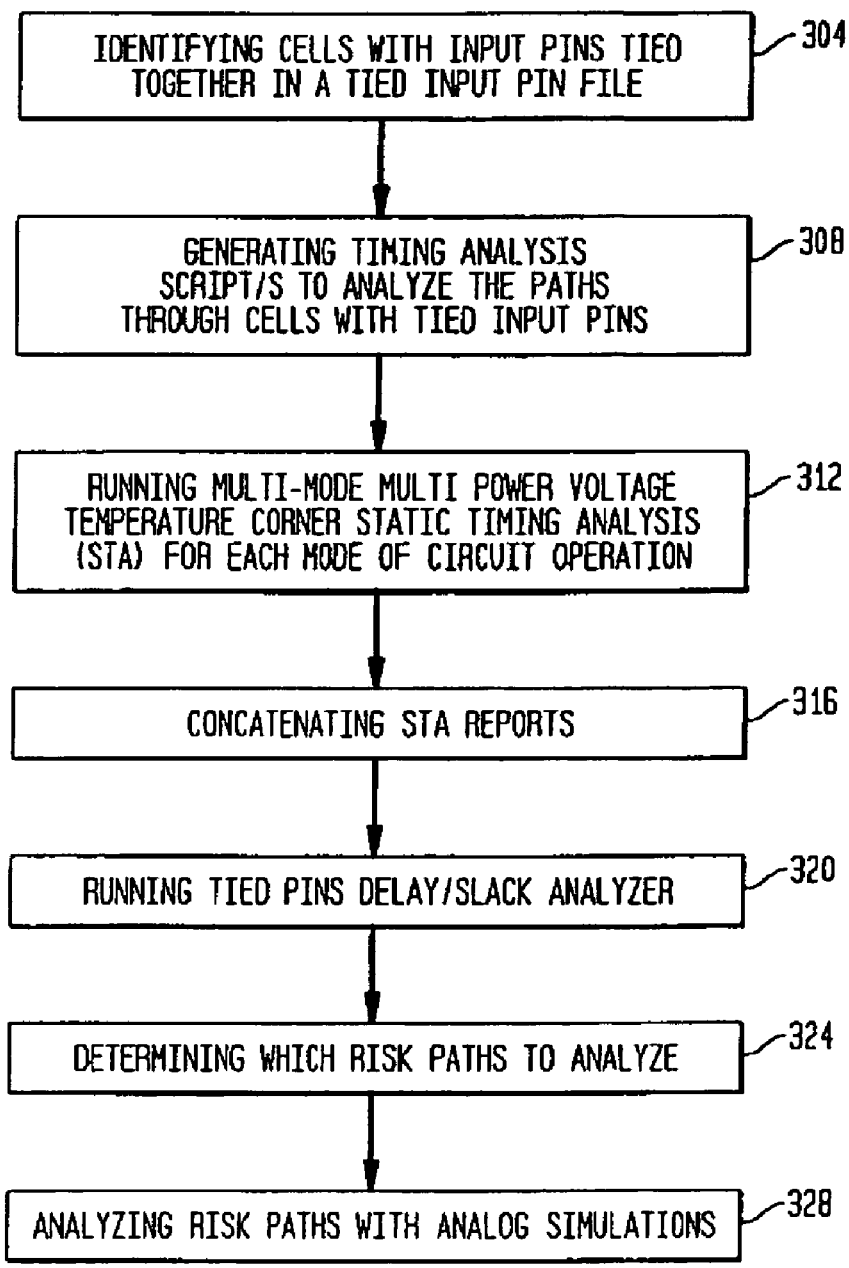
FIG. 3 illustrates a method for the measurement and prediction of hold time failure risk due to cells with tied input pins in accordance with an embodiment of the present invention.

FIG. 3 illustrates a method 300 for the measurement and prediction of hold time failure risk due to cells with tied input pins in a circuit being evaluated. The method 300 includes step 304 for identifying cells with tied input pins, step 308 for generating timing analysis scripts, step 312 for running multi-mode and multi power voltage temperature (PVT) static timing analysis (STA), step 316 for concatenating STA reports, step 320 for running the tied input analysis tool, and step 324 for analyzing risk for the signal paths (risk paths).

The step 304 for identifying cells with tied input pins includes running gate level netlist audits which identifies cells with tied input pins in a tied input pin file. For example, this report may be generated along with other topological and performance characteristics of the signal paths and cells used in a design.

The step 308 for generating a timing analysis script or scripts includes parsing the tied input pin file and generating the timing analysis script/s, such as might be required to run a timing analysis on timing tools, such as PrimeTime® of Synopsis, Inc. For example, a timing analysis script is included in the main timing analysis scripts for each mode of operation. A timing analysis script contains instructions for the timing tool to analyze the paths through each of the cells with tied input pins and does not contain any mode specific information. The timing analysis script causes hold time for the paths containing the cells with tied input pins to be reported. For example, for combinational cells, timing is reported through the cell output pins to capture the timing for an entire sequential signal fanout. For sequential cells, timing is reported to the input pin of the cells.

The step 312 for running multi-mode and multi power voltage temperature (PVT) static timing analysis (STA) may be run as a parallel process where STA is run on individual modes at the PVT corners in parallel. The PVT corners represent power, voltage, and temperature operating limits for the circuit being evaluated. The circuit is run in different modes because critical path timing, for example, through the same point may be different in different modes. In addition, some signal paths may be constrained in some modes and unconstrained in other modes. It is noted that risk paths should be examined in the presence of on-chip variations that may occur due to topological proximity of cells and in the presence of cross-talk.

The step 316 for concatenating STA reports involves combining the multiple multi-mode reports from each PVT corner into consolidated separate files. At the end of this step 316 there is one file per PVT corner containing timing reports for all the modes using the scripts generated in step 308.

The step 320 for running the tied input analysis tool advantageously assesses the risk associated with the signal paths containing the cells with tied input pins using equations 1, 2, and 3 as appropriate and as described in more detail with regards to the method of FIG. 4 below. The tied input analysis tool may be run in at least two modes. A first mode is used if the worst case delay reduction percentage data is not available. In the first mode, the risk analysis is based on the STA timing reports of step 316 and equation 1 is calculated for each signal path that includes tied input pins. A second mode is used when the worst case delay reduction percentage data for a technology library is available in addition to the STA timing reports of step 316. In the second mode, equation 2 is calculated for each signal path that includes tied input pins. In the second mode, an additional timing margin and total delay reduction analysis may also be calculated for each of the signal paths at risk. Step 320 provides a summary including, data, such as, total number of tied pin cells processed, number of tied pin cells that were timing constrained, number of tied pin cells for which the signal path was unconstrained, a tied-delay/slack % histogram, and slack by cell type and pin, for example.

The step 324 for determining which signal paths to analyze based on the risk for the signal path (the "risk path"), based on an evaluation of the critical signal paths and the risk reported. If the method 300 is carried out early in the chip development schedule, a design team may decide to fix all the signal paths having any risk associated with them and avoid the next step, step 328.

The step 328 for analyzing risk paths includes analyzing the risk reports generated from step 320 and analyzing selected paths further by use of analog simulation tools, such as HSPICE®. Based on the analog simulation analysis, some signal paths may need to be changed to fix the problem or the risk may be evaluated and deemed acceptable. The risk may be acceptable, for example, if the timing analysis tool inserted additional hold uncertainty in a path and this additional delay time may provide a timing assessment that is too conservative.

Figure 4:
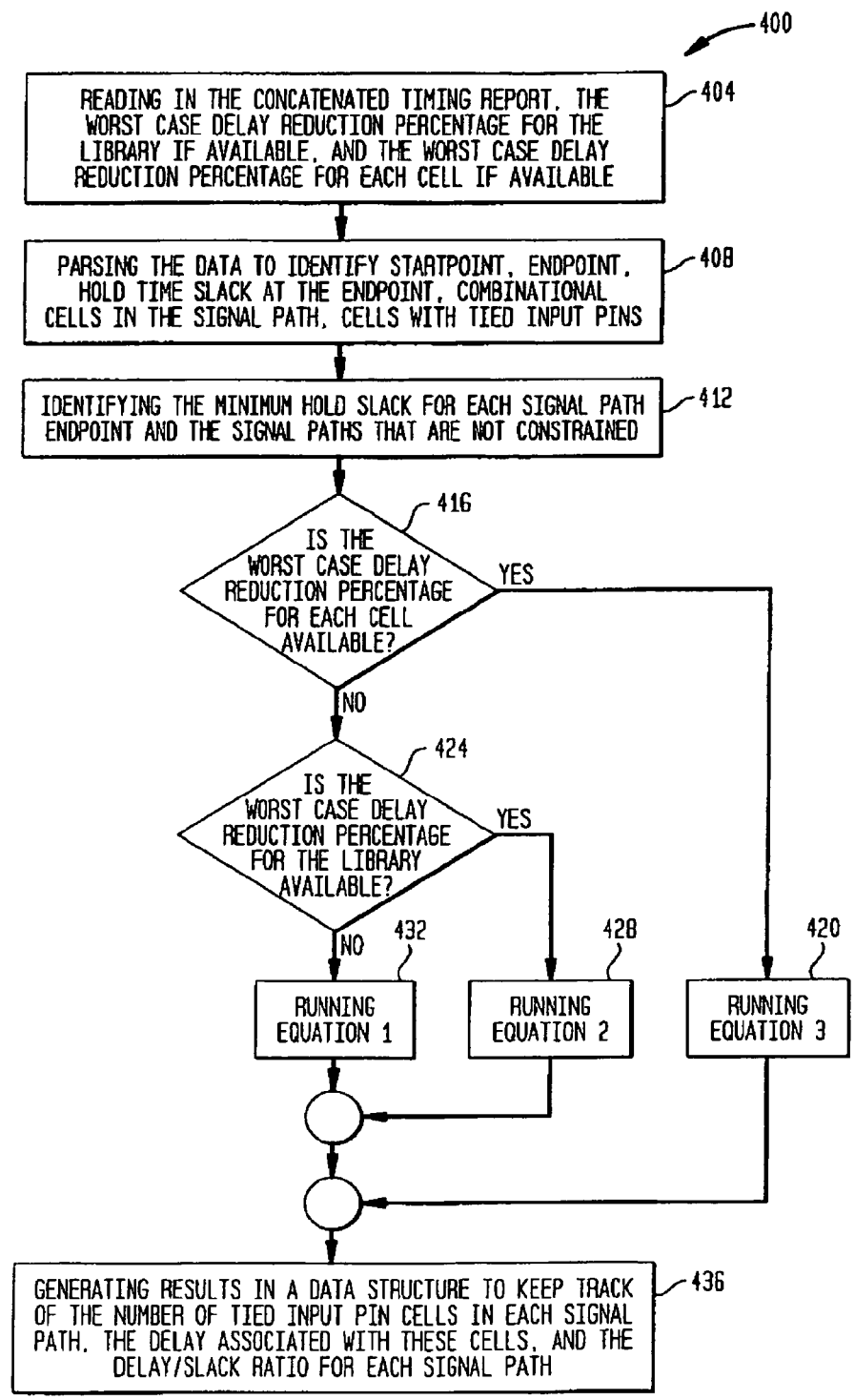
FIG. 4 illustrates a method for analysis of delay and slack for signals having tied input pins in accordance with an embodiment of the present invention.

FIG. 4 illustrates a method 400 for analysis of delay and slack for signals having tied input pins in accordance with an embodiment of the present invention. The method 400 is made up of a step 404 for reading data, a step 408 for parsing the data, a step 412 for identifying timing and signal paths, steps 416 and 424 for determining which analysis equation or equations to use, steps 420, 428, and 432 for running the selected equation or equations, and a step 436 for generating results.

The step 404 for reading data includes reading the concatenated timing reports from step 316 of FIG. 3, the worst case delay reduction percentage for the technology library if available, and the worst case delay reduction percentage for each cell if available.

The step 408 for parsing the data includes identifying for each signal path the start point, the end point, the hold time slack at the end point, combinational cells in the signal path, and cells with tied input pins.

The step 412 for identifying timing and signal paths includes identifying the minimum hold slack for each signal path end point and the signal paths that are not constrained.

In step 416, it is determined if the worst case delay reduction percentage for each cell is available. If it is available, then step 420 runs equation 3. If the worst case delay reduction percentage for each cell is not available, then the method 400 proceeds to step 424. In step 424, it is determined if the worst case delay reduction percentage for the technology library is available. If it is available, then step 428 runs equation 2. If it is not available, then step 432 runs equation 1.

The step 436 for generating results includes generating results in a data structure to keep track of the number of tied input pin cells in each signal path, the delay associated with these cells, and the delay/slack ratio for each signal path. The data structure is processed to produce a report file which contains, for example, signal path risk sorted from the highest risk signal paths to the lowest risk signal paths, a risk profile histogram for the circuit being evaluated, and the like.

While the present invention has been disclosed in a presently preferred context, it will be recognized that the present teachings may be adapted to a variety of contexts consistent with this disclosure and the claims that follow.

For example, the present invention is disclosed mainly in the context of independent timing analysis tools, such as static timing analysis tools. It will be appreciated that it may also be employed with dynamic timing analysis tools and synthesis tools which have embedded timing analysis functions. It will also be appreciated that variations in the particular hardware and software employed are feasible, and to be expected as both evolve with time. Other such modifications and adaptations to suit a particular design application will be apparent to those of ordinary skill in the art.

We claim:

1. A method for risk estimation comprising:
   identifying in a circuit a signal path having at least one cell with tied input pins;
   running a timing analysis on the signal path to determine a hold slack at the end of the signal path, wherein the hold slack is the difference of a worst case delay through the signal path and a cycle time of the circuit;
   estimating a risk to the signal path of incorrect timing analysis results, the risk related to a ratio of the delay through the at least one cell to the hold slack;
   generating for a signal path having a plurality of cells with tied input pins, a summation of the delays through the plurality of cells;
   determining a ratio of the summation to the hold slack, wherein the ratio represents the risk;
   determining a worst case delay reduction percentage for cells of a selected plurality of cells available in a technology library;
   selecting a representative worst case delay reduction percentage for the technology library based on the determined worst case delay reduction percentage for the cells;
   running an analog simulation for each cell with tied input pins in a signal path to determine an analog time delay for each cell; and
   comparing the analog time delay with a tool time delay associated with each cell, where the tool time delay is determined from the timing analysis tool, the comparison is used to determine the worst case delay reduction percentage.

2. The method of claim 1 wherein the estimating the risk further comprises:
   multiplying the ratio by the representative worst case delay reduction percentage to produce a result that represents the risk.

3. The method of claim 1 further comprising:
   determining a worst case delay reduction percentage for each cell available in the technology library.

4. The method of claim 3 wherein the estimating the risk further comprises:
   multiplying, for each cell with tied input pins, the delays through the cell by the worst case delay reduction percentage associated with each cell producing an improved delay value;
   generating for each identified signal path a summation of the improved delay values;
   determining a ratio of the summation to the hold slack, wherein the ratio represents the risk.

5. A computer-readable medium containing a program for risk estimation comprising the steps:
   identifying in a circuit a signal path having at least one cell with tied input pins;
   running a timing analysis on the signal path to determine a hold slack at the end of the signal path, wherein the hold slack is the difference of a worst case delay through the signal path and a cycle time of the circuit;
   estimating the risk to the signal path of incorrect timing analysis results, the risk related to a ratio of the delay through the at least one cell to the hold slack;
   generating for a identified signal path having a plurality of cells with tied input pins, a summation of the delays through the plurality of cells with tied input pins;
   determining a ratio of the summation to the hold slack, wherein the ratio represents the risk;
   determining a worst case delay reduction percentage for cells of a selected plurality of cells available in a technology library;
   selecting a representative worst case delay reduction percentage for the technology library from the determined worst case delay reduction percentage for the cells;
   running an analog simulation for each cell with tied input pins in a signal path to determine an analog time delay for each cell; and
   comparing the analog time delay with a tool time delay associated with each cell, where the tool time delay is determined from the timing analysis tool, the comparison is used to determine the worst case delay reduction percentage.

6. The computer-readable medium of claim 5 wherein the estimating the risk further comprises:
   multiplying the ratio by the representative worst case delay reduction percentage to produce a result that represents the risk.

7. The computer-readable medium of claim 5 further comprising:
   determining a worst case delay reduction percentage for each cell available in the technology library.

8. The computer-readable medium of claim 7 wherein the estimating the risk further comprises:
   multiplying, for each cell with tied input pins, the delays through the cell by the worst case delay reduction percentage associated with each cell producing an improved delay value;
   generating for each identified signal path a summation of the improved delay values;
   determining a ratio of the summation to the hold slack, wherein the ratio represents the risk.

9. An apparatus for estimating a risk of incorrect timing analysis results comprising:
   a chip database having a circuit synthesized to a technology library with signal paths having tied input pins;
   a tools database having timing analysis tools, constraint files and parasitic data for signal paths, delay calculation model tables based on cell characterization data, and a tied input analysis tool;
   a processor for running the tied input analysis tool for estimating the risk of incorrect timing analysis of signal paths having cells with tied input pins;
   a representative worst case delay reduction percentage for the technology library;
   worst case delay reduction percentages for each cell in the technology library;
   generating for each identified signal path a summation of the delays through the cells with tied input pins on the identified signal path; and
   determining a ratio of the summation to a value that is the difference of the worst case delay and the circuits cycle time, wherein the ratio represents the risk.

10. The apparatus of claim 9 wherein the running the tied input analysis tool further comprises:
    generating for each identified signal path a summation of the delays through the cells with tied input pins;
    determining a ratio of the summation to a value that is a difference of the worst case delay and the circuits cycle time; and
    multiplying the ratio by the representative worst case delay reduction percentage to produce a result that represents the risk.

11. The apparatus of claim 9 wherein the running the tied input analysis tool further comprises:
    multiplying, for each cell with tied input pins, the delays through the cell by the associated worst case delay reduction percentage associated with each cell producing an improved delay value;
    generating for each identified signal path a summation of the improved delay values; and
    determining a ratio of the summation to a value that is a difference of the worst case delay and the circuits cycle time, wherein the ratio represents the risk.

* * * * *